Apr. 24, 1923.
J. MIESSNER
CLOTHESLINE REEL
Filed Oct. 5, 1922
1,453,157
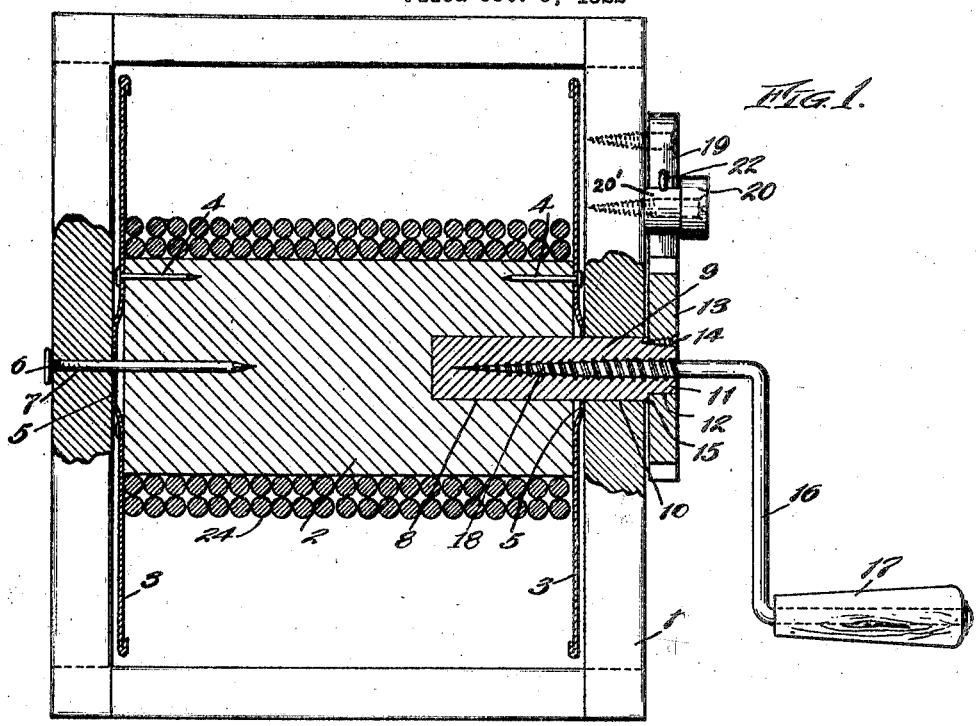
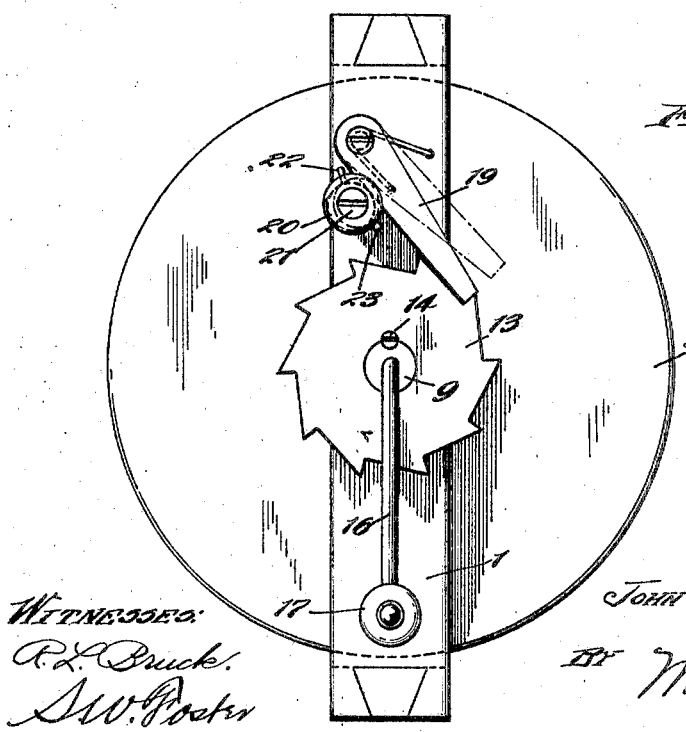
WITNESSES:
R. L. Bruck.
S. W. Poster
INVENTOR,
JOHN MIESSNER,
BY Munn & Co.
ATTY'S.

Patented Apr. 24, 1923.

1,453,157

UNITED STATES PATENT OFFICE.

JOHN MIESSNER, OF CLEVELAND, OHIO.

CLOTHESLINE REEL.

Application filed October 5, 1922. Serial No. 592,623.

*To all whom it may concern:*

Be it known that I, JOHN MIESSNER, a citizen of the United States, and a resident of Cleveland, in the county of Cuyahoga and State of Ohio, have invented a new and Improved Clothesline Reel, of which the following is a full, clear, and exact description.

This invention relates to improvements in clothes line reels, an object of the invention being to provide a reel which facilitates the putting up, or taking down of a clothes line, in that it economizes time and labor, and allows any desired length of line to be used without danger of dragging the line on the ground, either in putting it up or taking it down.

A further object is to provide a reel which prevents twisting and injurious bending of the line compelling it to wind smoothly on the reel or unwind smoothly therefrom, and thereby lengthen the life of the line.

A further object is to provide a reel of the character stated, of improved construction whereby the parts are long lived and facilitate the manipulation of the line.

With these and other objects in view, the invention consists in certain novel features of construction and combinations, and arrangement of parts, as will be more fully hereinafter described and pointed out in the claims.

In the accompanying drawings—

Figure 1 is a view partly in elevation and partly in longitudinal section illustrating my improved clothes line reel.

Figure 2 is a view in end elevation.

1 represents a frame which is preferably rectangular in form with its several members dovetailed or otherwise rigidly secured together. This frame 1 supports a drum 2 having metal disks 3 at its ends and secured thereto by nails or other securing devices 4.

The central portions of the disks 3 are preferably laterally offset, as shown at 5 to present a minimum of friction surface against the ends of frame 1 and also space the main portions of the disks from the frame.

A simple form of bearing for one end of the drum is indicated by the reference numeral 6. This part 6 may constitute an ordinary nail which is projected through an opening 7 in the end of frame 1 and has a bearing in said opening and is driven through the disk 3 and into the drum 2.

In the end of drum 2 opposite to the nail 6 I provide a longitudinal bore 8 and in this bore I secure a journal 9 which is preferably of wood and which may be cemented or otherwise permanently fixed in the bore 8 after being projected through the center of the disk 3. The frame 1 is made with an opening 10 through which the journal 9 projects and has a bearing therein. The outer end of the journal 9 is reduced in diameter as shown at 11 and snugly fits an opening 12 in the center of a ratchet wheel 13, and a locking screw 14 is screwed into the journal and into the ratchet wheel at their point of juncture, to form an effective key to compel the journal drum and ratchet wheel to turn together.

By reducing the outer end of the journal 9 a shoulder 15 is provided which spaces the ratchet wheel 13 from the frame to prevent friction.

16 represents a crank arm having a handle 17 at one end and having its other end screw threaded as shown at 18 to permit the same to be screwed longitudinally into the journal and effectually lock the parts together. In assembling these parts, the journal, ratchet wheel, and crank arm, are secured together as above described, and the journal then projected through the opening 10 of the frame 1 and secured in the drum.

The ratchet wheel 13 is engaged by a pivotally mounted spring pressed pawl 19 carried by the frame 1 and this pawl may be moved out of operative position by a cam button 20. This button 20 is provided with a cam portion 20' having rotary mounting on a screw 21 secured in the frame 1 and engaging the pawl 19 so that when the button is turned in one direction it will force the pawl to the dotted line position shown in Figure 2 and allow the reel to turn freely in either direction.

A pin 22 is fixed to this cam button 20 and engages a stop pin 23 on frame 1 to limit the turning movement of the cam button and to compel the latter to be properly positioned to hold the pawl out of engagement with the ratchet wheel as occasion may require.

It will thus be noted that by reason of the construction above described, that the main parts of the reel may be of wood but I would have it understood that I do not limit myself to the particular materials employed as I may use any materials found desirable.

24 represents a rope, or line, which is secured to, and wound upon, the drum 2, and the winding action of the line on the drum is performed by holding the frame 1 in one hand and turning the crank arm 16 with the other hand, the pawl 19 riding over the teeth of the ratchet wheel 13 and preventing retrograde movement. To draw the line over the drum, the cam button 20 is turned to hold the pawl 19 away from the ratchet wheel 13, when the line can unwind as much as is desired, and then the cam button can be turned to release the pawl and lock the drum against further unwinding.

Various slight changes may be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A device of the character described, comprising a frame, a drum mounted in the frame and having a longitudinal bore in one end, a journal secured in said bore and projecting through the frame and having a bearing in the latter, said journal having a reduced outer end forming an annular shoulder, a ratchet wheel secured on the reduced outer end of the journal and held by the shoulder away from the frame, a spring pressed pawl engaging the ratchet wheel, a cam turn button on the frame and adapted to move the pawl out of engagement with the ratchet wheel, and a crank arm secured to the journal.

2. A device of the character described, comprising a frame, a drum mounted in the frame and having a longitudinal bore in one end, a journal secured in said bore and projecting through the frame and having a bearing in the latter, said journal having a reduced outer end forming an annular shoulder, a ratchet wheel secured on the reduced outer end of the journal and held by the shoulder away from the frame, a spring pressed pawl engaging the ratchet wheel, a cam turn button on the frame and adapted to move the pawl out of engagement with the ratchet wheel, a pin on the turn button, and a pin on the frame engaged by the first mentioned pin to limit the turning movement of the button, and a crank arm secured to the journal.

3. A device of the character described, comprising a frame, a drum mounted in the frame and having a longitudinal bore in one end, a journal secured in said bore and projecting through the frame and having a bearing in the latter, said journal having a reduced outer end forming an annular shoulder, a ratchet wheel secured on the reduced outer end of the journal and held by the shoulder away from the frame, a spring pressed pawl engaging the ratchet wheel, a cam turn button on the frame and adapted to move the pawl out of engagement with the ratchet wheel, a pin on the turn button, and a pin on the frame engaged by the first mentioned pin to limit the turning movement of the button, a crank arm having a screw threaded end screwed longitudinally into the journal, and a handle on the crank arm.

JOHN MIESSNER.